United States Patent [19]

Kawasaki

[11] 3,840,882

[45] Oct. 8, 1974

[54] CONTROL SYSTEM FOR A CAMERA FLASH DEVICE

[75] Inventor: Masahiro Kawasaki, Tokyo, Japan

[73] Assignee: Asahi Kogaku Kogyo Kabushiki Kaisha, Tokyo-to, Japan

[22] Filed: Sept. 19, 1973

[21] Appl. No.: 398,809

[30] Foreign Application Priority Data
Sept. 22, 1972 Japan.............................. 47-95275

[52] U.S. Cl. ................................................ 354/33
[51] Int. Cl. ...................................................... H05b
[58] Field of Search .............. 354/33, 34; 315/241 P

[56] References Cited
UNITED STATES PATENTS

| | | | |
|---|---|---|---|
| 3,648,104 | 3/1972 | Ackermann ...................... | 354/33 X |
| 3,727,100 | 4/1973 | Kuraishi............................ | 354/33 X |
| 3,737,721 | 6/1973 | Ogawa ............................... | 354/33 X |

Primary Examiner—Samuel S. Matthews
Assistant Examiner—Michael L. Gellner
Attorney, Agent, or Firm—Steinberg & Blake

[57] ABSTRACT

A control system for flash illumination of a camera which operates with a flash means for providing flash illumination during exposure of the film. A light responsive element is positioned to receive light resulting from the flash means and converts this light into a corresponding electrical quantity. An AC amplifier circuit amplifies the electrical quantity. A suitable electrical circuit converts the amplified electrical quantity into a current which is integrated in synchronism with the flash illumination. A comparison circuit is electrically connected to receive the integrated value and compare it with a comparison voltage determined in accordance with photographic information other than brightness and when the integrated value exceeds the comparison voltage it actuates a flash terminating control electrically connected with the flash means for terminating the flash illumination therefrom.

7 Claims, 3 Drawing Figures

CONTROL SYSTEM FOR A CAMERA FLASH DEVICE

BACKGROUND OF THE INVENTION

The present invention relates to cameras.

In particular, the present invention relates to control systems for cameras utilizing a camera flash device.

In using a camera for film exposure using a flash device for providing artificial illumination, a control circuit is frequently included which measures the light and regulates the amount of flash illumination in accordance with the measured amount of light. Conventional external light receiving circuitry utilizes a photoresponsive element which detects the light and introduces a current from the photoresponsive element into the computing circuitry by utilizing a grounded base or a grounded emitter transistor circuit. If such a conventional circuit were utilized with internal light receiving circuitry or flashmatic systems, then as a result of the decrease of current through the light receiving element, a decrease which can be as much as one-fiftieth to one-two hundredth of the internal light system, the load resistance as seen from the light receiving element increases and as a result the speed of light response is lowered. It therefore becomes difficult to properly control the amount of flash illumination required for proper exposure. This situation is especially aggravated in the low illumination range where there is influence of leakage current in the light receiving element when utilizing the DC amplification circuit as is conventionally used.

Because of the increase in the load as seen from the light receiving element accurate control of the exposure time is difficult with conventional control circuitry.

SUMMARY OF THE INVENTION

It is accordingly a primary object of the present invention to provide a system for controlling the flash illumination of the camera which avoids the aforementioned drawbacks of the prior art devices.

In particular, it is an object of the present invention to provide a control system for a camera flash device which provides proper exposure by automatically stopping the flash device.

Also, it is an object of the present invention to provide a control system for a camera flash device wherein the load resistance, as seen by the light receiving element which receives the light from the flash device, is constant and can be made very small so that in the low illumination range the speed of the response is not reduced and the flash illumination can be correctly controlled.

In addition, it is an object of the present invention to provide a control system for a flash device in a camera which utilizes an AC amplifier to amplify to a sufficient degree, with no influence of leakage current, the output voltage of a photoelectric transformation element which receives reflected light from the flash device.

Thus, it is an object of the present invention to provide a system of the above type which is far more accurate than previously known similar systems while at the same time being more reliable in its operation.

According to the invention the camera has a flash means for providing flash illumination during the exposure of film. A light responsive element is positioned for receiving light resulting from the flash illumination and for converting the received light into a corresponding electrical quantity. An AC amplifier circuit receives the electrical quantity and provides an amplified electrical quantity which is the converted into a current. An integrating circuit integrates the current in synchronism with the flash illumination. A comparison circuit electrically connected to the integrating circuit compares the integrated value with a comparison voltage determined in accordance with photographic information other than brightness and when the integrating value exceeds the comparison voltage it actuates a flash terminating circuit electrically connected with the flash means for automatically terminating the flash illumination therefrom.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
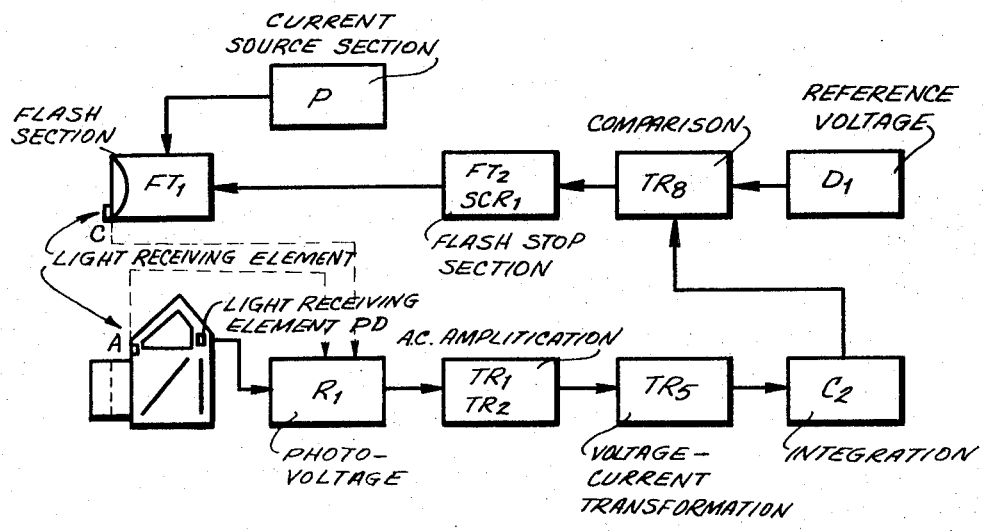
FIG. 1 is a schematic block diagram illustrating the principles of operation of the system of the invention.

Referring first to FIG. 1, the principle according to which the present invention operates is schematically illustrated therein. Thus, it will be seen that at the top of FIG. 1 there is an indication of a current source section P which provides the energy to be utilized by the flash means $FT_1$ which is indicated schematically as the flash section. Situated just below the flash section is the schematically illustrated single lens reflex camera which has the schematically illustrated objective through which light enters to be reflected upwardly by the inclined mirror and after travelling through the viewfinder prism this light is received by an internal light receiving element PD which provides a current proportional to the amount of light received. The current is changed into a proportional voltage by the photo-voltage section $R_1$ so that a photo voltage is produced. This is amplified by an AC amplifier in the AC amplification section $TR_1$, $TR_2$. The output voltage is transformed into a current at the current voltage transformation section $TR_5$ which transmits a signal to an integration section designated by an integration capacitor $C_2$. The integration voltage produced in the integration section is compared in comparison section $TR_8$ with a reference voltage from a section designated $D_1$ and when the integration voltage exceeds the reference voltage a signal is sent to the flash shop section $FT_2$, SCR, in order to actuate it so as to terminate automatically the operation of the flash section $FT_1$.

Although an internal light receiving element is shown, an external light receiving element would be utilized. Two possible locations of the external light receiving element are shown in FIG. 1 namely, locating the element in front of the flash section at position C or locating the element at the front of the camera at position A. Thus, the light receiving element can be so positioned as to be able to either externally or internally measure the light reflected by the object to be photographed.

Figure 2:
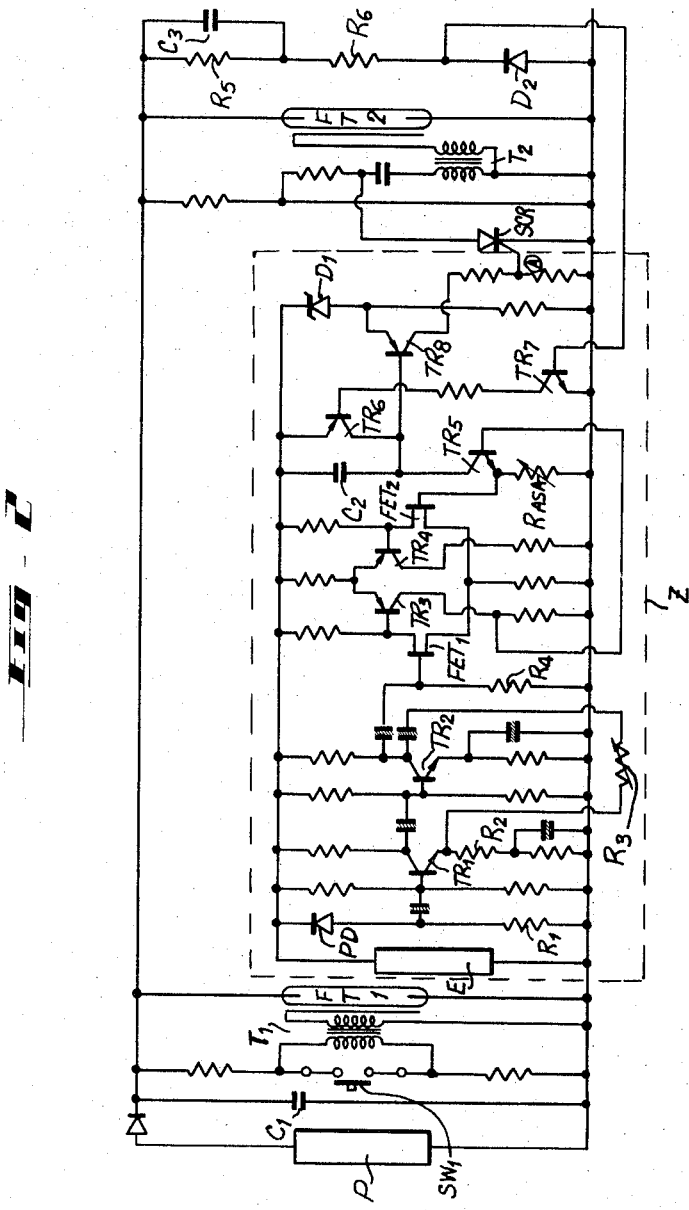
FIG. 2 is a wiring diagram of one possible system according to the invention.

Referring now to FIG. 2 there is shown a wiring diagram forming one embodiment of the structure shown in FIG. 1. A high voltage DC source P is used to charge a capacitor $C_1$ and through a properly positioned diode the capacitor $C_1$ is used to energize the flash tube $FT_1$, the flash tube $FT_1$ is triggered by means of the secondary of transformer $T_1$ whose primary is connected across a switch $SW_1$. The ends of the switch $SW_1$ are connected respectively across the ends of the flash tube $FT_1$ by means of suitable resistors.

A low voltage DC source E provides energy to an information processing section Z shown within the dotted lines and including a photo diode PD which is positioned to be able to measure the light reflected by the object to be photographed. The resulting photo current flows through a resistor $R_1$ thereby producing a photo voltage across it. This is amplified by an RC coupled AC amplification circuit including transistors $TR_1$ and $TR_2$ producing and output voltage across resistor $R_4$ which is equal to the voltage across resistor $R_1$ multiplied by the amplification factor of the AC amplifier. Voltage feedback is made through the resistor $R_2$ and current feedback is made through the resistor $R_3$ so as to stabilize the gain of the AC amplifier and to improve the frequency characteristic thereof. Suitable resistors and capacitors are shown connected as is well known in the art. The voltage across the resistor $R_4$ is electrically coupled to the gate of a field effect transistor $FET_1$ which together with $FET_2$ and the transistors $TR_3$ and $TR_4$ form a differential amplifier. A transistor $TR_5$ has its emitter connected to the gate of $FET_2$ and its base connected to the collector of $TR_3$ such that the base potential of the transistor $TR_5$ is controlled whereby the gate potentials of the field effect transistors $FET_1$ and $FET_2$ are equal to each other. As a result, the amplified photo voltage across the resistor $R_4$ becomes equal to the voltage across the resistor $R_{ASA}$. The current through the collector-emitter circuit of transistor $TR_5$ passes through integration capacitor $C_2$ which is located in parallel with the collector and emitter of transistor $TR_6$, the base of which is connected to the collector-emitter circuit of transistor $TR_7$. The base of transistor $TR_7$ is connected to one end of a diode $D_2$ which is connected in series with resistor $R_6$ and with the parallel connected resistor $R_5$ and capacitor $C_3$. The series circuit of resistor $R_6$, diode $D_2$ and the parallel resistor $R_5$, capacitor $C_3$, is connected in parallel with the main capacitor $C_1$ and serves as a voltage detection circuit. A transistor $TR_8$ has its base connected to the collector of transistor $TR_6$ and its emitter connected to a Zener diode $D_1$. The collector of transistor $TR_8$ is coupled to the gate of an SCR which is connected through appropriate resistors and capacitors to the primary of transformer $T_2$ whose secondary serves to trigger a flash stop or quenching tube $FT_2$ connected in parallel with the flash tube $FT_1$.

The sources P and E are respectively connected in series with unillustrated switches which are automatically closed in any suitable way at the beginning of a photographing operation, as by the initial part of the depression of the shutter-tripping plunger, in order to place the circuitry in the illustrated operative condition, the switch in series with source P being opened after capacitor $C_1$ is charged.

The operation of the circuit shown in FIG. 2 is as follows:

Prior to the flash, the transistor $TR_7$ is conducting, having a base current equal to $V_P/R_5+R_6$ representing the voltage of the high voltage source P divided by the sum of the resistors $R_5$ and $R_6$. The transistor $TR_6$ is therefore also conducting and effectively short circuits the integration capacitor $C_2$ whereby the potential difference across the integration capacitor $C_2$ is kept at zero.

Switch $SW_1$ is then closed, and the flash tube $FT_1$ is triggered causing the capacitor $C_1$ to discharge through the flash tube $FT_1$ thereby causing flash illumination. As a result, the potential of the main capacitor $C_1$ decreases rapidly and, as a result of the transient which occurs, the voltage detection circuit consisting of the resistor $R_5$, $R_6$ and diode $D_2$ with the capacitor $C_3$ in parallel with the resistor $R_5$ causes the base of transistor $TR_7$ to suddenly become negative which makes the transistor $TR_7$ become non-conductive thereby rendering transistor $TR_6$ non-conductive. As a result, the integration capacitor $C_2$ can now be charged.

As the flash tube is triggered causing flash illumination, the photo diode PD receives the light reflected by the object to be photographed. The photo diode produces current proportional to the light it receives. The photo current flows through the resistor $R_1$ which produces a photo voltage across it. The photo voltage is amplified by the AC amplifier thereby producing a voltage across resistor $R_4$ which is equal to the voltage across resistor $R_1$ times the amplification factor of the AC amplifier. If the photo current is represented by $I_p$, the voltage across the resistor $R_1$ will be equal to $R_1 I_P$ and the voltage across the resistor $R_4$ will be equal to $A$ times $R_1 I_P$, where A represents the amplification produced by the AC amplifier.

Because of the equal $FET_1$ and $FET_2$ parts of the differential amplifier the photo voltage across the resistor $R_4$ will be impressed across the variable resistor $R_{ASA}$. This latter mentioned variable resistor is adjusted in accordance with the sensitivity value of the film being used. In addition, this resistor may also be arranged such that its resistance value also varies in accordance with the diaphragm setting. The collector current passing through the transistor $TR_5$ will therefore be represented by the formula $$i_5 = i_P \times R_1/R_{ASA} \times A$$

where $I_P$ is the photo current of the photo diode PD, A is the amplification gain of the AC amplifier, $R_1$ is the resistance of the resistor $R_1$ and $R_{ASA}$ is the resistance value of the resistance $R_{ASA}$. Thus, the current through the transistor $TR_5$ is proportional to the photo current $I_P$ and is at the same time controlled by the resistance $R_{ASA}$. The current through the transistor $TR_5$ now charges the capacitor $C_2$. As the voltage across the integrating capacitor $C_2$ increases, and the resulting integration voltage becomes greater than the potential of the voltage regulator diode $D_1$ plus the base to emitter potential $V_{BE}$ of the transistor $TR_8$, the transistor $TR_8$ becomes conductive and the silocon controlled rectifier SCR is triggered. When the SCR is triggered the quenching tube $FT_2$ becomes conductive by means of the transformer $T_2$, thereby receiving the charge from the capacitor $C_1$ so that the flash tube $FT_1$ is stopped and accordingly the flash illumination is terminated.

Figure 3:
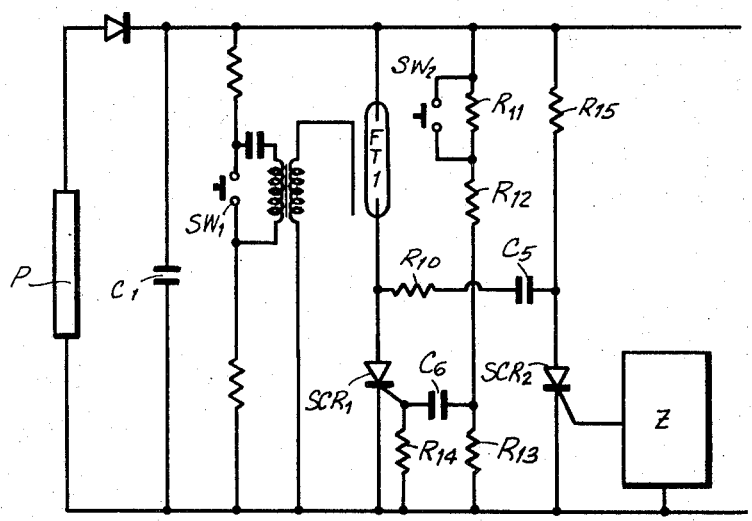
FIG. 3 is a wiring diagram of another possible system according to the invention.

Referring now to FIG. 3 there is shown a wiring diagram forming another embodiment of the present invention. In this figure, like parts as in FIG. 2 are similarly identified. In the embodiment shown in FIG. 3 the information processing section Z shown within the dotted line in FIG. 2 is herein represented by the single block Z and produces an output at the point A as was shown in FIG. 2. The output at point A is connected to the gate of a silocon controlled rectifier $SCR_2$ which is connected by means of a suitable resistor $R_{15}$ in parallel with the flash tube $FT_1$. Another silocon controlled rectifier $SCR_1$ is connected in series circuit arrangement with the flash tube $FT_1$ and has its gate triggered by means of the series circuit arrangement of resistors $R_{11}$, $R_{12}$, $R_{13}$, all interconnected across the high voltage source P. Resistor $R_{14}$ is connected between the gate and one terminal of the voltage source P. Capacitor $C_6$ interconnects the ends of resistors $R_{13}$ and $R_{14}$. A switch $SW_2$ is connected in parallel across resistor $R_{11}$. Resistor $R_{10}$ in series with capacitor $C_5$ interconnects the anodes of the two silocon controlled rectifiers $SCR_1$ and $SCR_2$.

The operation of the circuit shown in FIG. 3 is as follows:

The switches $SW_1$ and $SW_2$ are so arranged as to be closed simultaneously. When these switches are closed, switch $SW_2$ causes the silocon controlled rectifier $SCR_1$ to be triggered by shorting out resistor $R_{11}$ and thereby causing a sudden increase in current at the gate of the $SCR_1$. Simultaneously, closure of the switch $SW_1$ causes the flash tube $FT_1$ to be triggered and since $SCR_1$ in series with flash tube $FT_1$ has been rendered conductive the charge on the capacitor $C_1$ can pass through the flash tube $FT_1$ thereby causing flash illumination. When a flash stop signal is produced at point A by means of the information processing section Z, as was described in connection with FIG. 2, the silocon controlled rectifier $SCR_2$ becomes conductive. Current passing through resistor $R_{15}$ will pass through the silocon controlled rectifier $SCR_2$ and, because of the capacitor $C_5$ and the resistor $R_{10}$, the discharge voltage of capacitor $C_5$ will act on the silocon controlled rectifier $SCR_1$ as a reverse bias whereby $SCR_1$ becomes nonconductive and the flash from flash tube $FT_1$ is terminated. In the embodiment shown in FIG. 3 it is therefore only necessary to utilize a single flash tube $FT_1$ and the quench tube $FT_2$ can be eliminated.

Thus, according to the present invention it is possible to make the response speed of the light receiving element sufficiently fast even within the low illumination range. Furthermore, there is no influence of the leakage current of the light receiving element into a DC amplification circuit. Sufficient amplification is made by means of the AC amplification circuit, and instability which results from integration of very small currents is eliminated. As a result, the amount of flash illumination can be correctly controlled and thereby proper exposure be achieved.

What is claimed is:

1. In a camera, flash means for providing flash illumination during exposure of film, light responsive means positioned for receiving light resulting from the flash illumination and for converging the received light into a corresponding voltage, AC amplifier means for receiving said voltage and providing an amplified voltage, flash terminating means electrically connected with said flash means for automatically terminating the flash illumination therefrom, converting circuit means electrically connected to said amplifier means for converting the amplified voltage into a current, integrating circuit means electrically connected to said converting circuit means for integrating said amplified voltage in synchronism with the flash illumination, and comparison circuit means electrically connected between said integrating circuit means and said flash terminating means for comparing an input voltage received from said integrating circuit means with a comparison voltage determined in accordance with photographic information other than brightness and for actuating said flash terminating means to terminate automatically said flash means when the input voltage and comparison voltage have a predetermined relationship.

2. The combination of claim 1 and wherein said light responsive means includes photosensitive means for producing a current proportionally related to the light received, and resistor means connected in series with said photosensitive means for providing across said resistor means a voltage proportional to the current from the photosensitive means.

3. The combination of claim 2 and wherein said AC amplifier means is an RC coupled amplifier having an input electrically coupled to the voltage across said resistor means for producing an amplified voltage.

4. The combination of claim 3 and wherein said converting circuit means includes differential amplifier means electrically connected to receive said amplified voltage and including transistor means and variable resistor means connected in the emitter circuit of said transistor means, the emitter potential of said transistor means being equal to that of the amplified voltage as a result of the action of said differential amplifier means, the setting of said variable resistor means providing the photographic information other than brightness.

5. The combination of claim 1 and wherein said flash means includes flash tube means and wherein said flash terminating means includes flash quenching means electrically connected in parallel with said flash tube means.

6. The combination of claim 1 and wherein said flash means includes flash tube means and wherein said flash terminating means includes switch means serially connected with said flash tube means for becoming nonconductive in response to said predetermined relationship between said input voltage and said comparison voltage.

7. The combination of claim 6 and wherein said switch means includes a first silocon controlled rectifier in series with said flash tube means for becoming conductive simultaneously with turning on of said flash means, a second silicon controlled rectifier electrically connected with said comparison circuit means for becoming conductive in response to said relationship between the input voltage and comparison voltage, and a series circuit including capacitor means in series with resistor means, said series circuit interconnecting the anodes of said first and second silocon controlled rectifies, whereby when said second silocon controlled rectifier becomes conductive a reverse bias is applied to the first silocon controlled rectifier thereby making it non-conductive.

* * * * *